May 20, 1958
D. E. PARTRIDGE
2,835,071
INSECT ELECTROCUTOR
Filed June 18, 1954
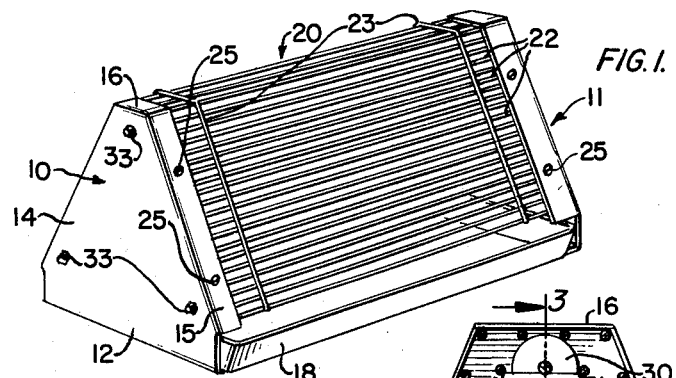
FIG. 1.
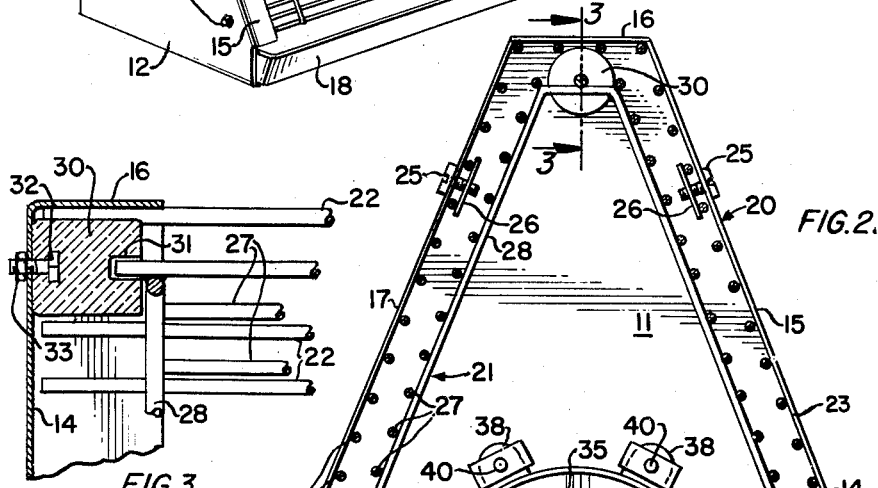
FIG. 2.
FIG. 3.
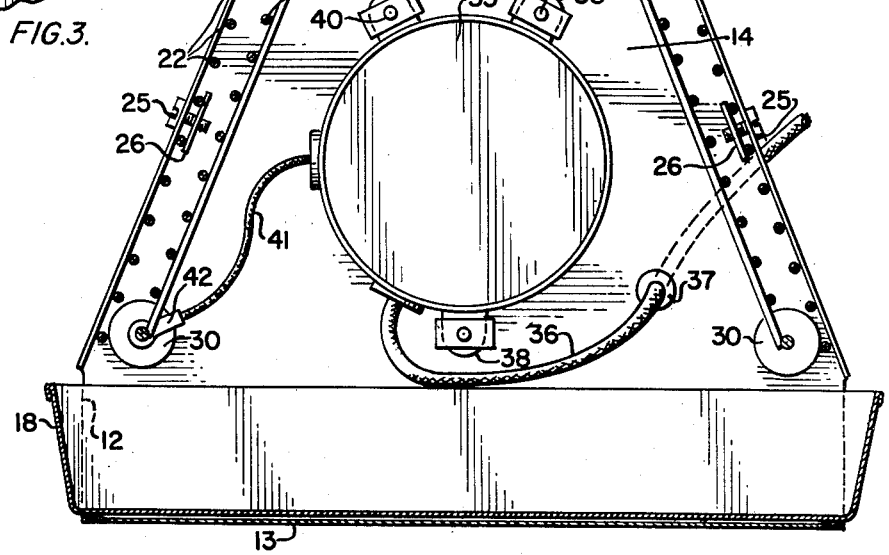
DONALD E. PARTRIDGE,
INVENTOR.
BY *Orville R. Leidner*

United States Patent Office 2,835,071
Patented May 20, 1958

2,835,071

INSECT ELECTROCUTOR

Donald E. Partridge, Los Angeles, Calif., assignor to United Export Packers, Inc., Los Angeles, Calif., a corporation of California Application June 18, 1954, Serial No. 437,709

1 Claim. (Cl. 43—112)

This invention relates generally to insect destroying devices, and particularly relates to an electrical insect destroyer or electrocutor.

It is an object of the present invention to provide an improved electrical insect destroyer which is of simple construction and hence relatively inexpensive to manufacture.

It is a principal object to provide an insect electrocutor having a pair of substantially upright grids through which an insect in flight may pass, said grids having a potential difference applied thereto of a value insufficient to cause a spark to jump the gap between the grids until an insect passing between the grids shortens the potential path and thereby electrocutes the insect.

A further object of the inventon is to provide a novel insect electrocutor which encloses a relatively large space and which extends a substantial distance in the vertical direction to improve the chance of trapping and electrocuting an insect in flight between the wire grid structures of the electrocutor.

The insect electrocutor of the present invention comprises an outer and an inner grid structure which are spaced from each other a predetermined and substantially constant distance. The outer grid structure is secured and electrically connected to two end covers. Preferably the end covers are of approximately triangular shape so that the end covers and outer grid structure form substantially a triangular prism which may be truncated. The inner grid structure is secured to the end covers and insulated therefrom by insulating means such as an insulating bracket which simultaneously secures the inner wire structure to the end covers and insulates them therefrom. Preferably, the end covers and outer grid are connected to one terminal of a high voltage source constituting a grounded terminal while the inner grid structure is secured to the other terminal which is the "hot" terminal. Hence, it is almost impossible for the user of the insect electrocutor of the invention to receive an electric shock in handling the device because only the inner wire structure is at a high voltage, while the outer grounded grid structure encloses and protects the inner grid structure.

The novel features that are considered characteristic of this invention are set forth with particularity in the appended claim. The invention, itself, however, both as to its organization and method of operation, as well as additional objects and advantages thereof, will best be understood from the following description when read in connection with the accompanying drawing, in which:

Fig. 1 is a view in perspective of an insect electrocutor embodying the present invention;

Fig. 2 is a cross-sectional view, on enlarged scale, of the insect electrocutor of Fig. 1; and Fig. 3 is an enlarged sectional view taken on line 3—3 of Fig. 2 and illustrating the insulating bracket which supports the inner wire grid structure of the electrocutor.

Referring now to the drawing, there is illustrated an electrical insect destroyer or electrocutor in accordance with the present invention provided with two identical end covers 10 and 11. The end cover 10 has a lower rectangular area 12 with a bent-over bottom portion 13 and an upper trapeziform area 14. In other words, the upper cover area 14 would form an isosceles triangle if extended to a point. The upper cover area 14 in the shape of a trapezium is provided with three side portions as shown at 15, 16 and 17. The entire end cover 10 may be made of sheet metal with the portions 15, 16 and 17 bent at right angles to the cover area 14. Since the end cover 11 is identical with end cover 10, it need not be described here. The two bottom portions 13 of the end covers form a support for a slidable tray 18.

The insect destroyer of the present invention further has an outer wire grid structure 20 and an inner wire grid structure 21. The outer grid structure 20 comprises a plurality of parallel wires 22. The wires preferably are relatively heavy so as to resist accidental bending thereof. The wires 22 are secured together for example by spot-welding two reinforcing rods 23 thereto and extending substantially at right angles to the wires 22. Hence wires 22 and rods 23 form a self-supporting grid structure. As shown particularly in Fig.s 1 and 2 the grid structure 20 has a trapeziform cross section and the space enclosed by grid structure 20 and end covers 10 and 11 forms a truncated triangular prism. The outer grid structure 20 has a cross section of approximately the shape of the letter A.

The outer grid structure 20 is secured to the two end covers 10 and 11 to provide a rigid structure which can be easily carried about. To this end the bent-over portions 15 and 17 are provided with suitable holes to receive screws 25, each extending between two adjacent wires 22. The screws are tightened by means of a suitable lock-nut 26 which may consist of a flat flexible plate having suitable cut-out portions for retaining the screw thread. In this manner the grid structure 20 and end covers 10 and 11 form a single rigid structure of the shape of a truncated triangular prism. It will be noted from Fig. 2 that the height of outer grid structure 20 approximately equals its width across the base.

The inner wire grid structure 21 also consists of a plurality of substantially parallel wires 27. The wires 27 are secured together by two reinforcing rods 28 attached to the wires, for example, by spot-welding and extending at right angles thereto. The reinforcing rods 28 are disposed near the outer ends of the wires 27 and have approximately the shape of the letter A as clearly shown in Fig. 2. The inner grid structure 21 is secured to and electrically insulated from the end covers 10 and 11 by means of insulating brackets 30, three of which are provided on either end of the grid structure. The insulating brackets 30 may be of cylindrical shape as illustrated and they may be made of porcelain. Each bracket has a hole or recess 31 for receiving one of the wires 27 of the grid structure 21. The opposite end of the bracket 30 has molded therein a stud or screw 32 with its head embedded in the bracket. Thus, the projecting end of each screw 32 may extend through a suitable hole in the end covers 10 and 11 and may be tightened by a nut 33. Accordingly, the insulating brackets 30 serve at the same time the purpose of insulating the inner grid structure 21 from the remainder of the device and also of supporting the grid in spaced relation to the outer grid 20 by securing it to the end covers.

As set forth hereinabove, insects entering the gap between the grid structures are killed when an electric potential is applied to the grid structures 20 and 21. To this end there may be provided an electric transformer 35 which may be connected to an electric cable 36 extending through a hole 37 in the end cover 11. The electric cable may be plugged into the usual domestic supply of 110 volt, 60 cycles per second alternating current. The transformer 35 has a secondary winding which may be designed to provide a voltage of 4,500 volts which is enough to destroy most insects with the spacing of the grids given hereinafter. One terminal of the secondary transformer winding is grounded by connecting it to the cover 11. To this end the transformer housing may be provided with several tabs 38 which are secured to the end cover 11 by screws 40 extending through suitable holes in the cover and by lock nuts. Hence, the transformer housing and one terminal of the transformer secondary winding are electrically and mechanically connected to the end covers and to the outer grid structure 20. The other terminal of the transformer secondary winding is connected to the insulated cable 41 which is electrically connected, for example, by soldering to one of the reinforcing rods 28 and hence to the inner wire structure 21.

The insect destroyer of the invention is energized by connecting the cable 36 to the domestic alternating current supply. Now the outer grid structure 20 and the end covers are at the same potential which is ground. The inner grid structure 21 is at a high alternating voltage which may amount to 4,500 volts. The vertical distance between two adjacent outer grid wires 22 may be between 7/16 inch and 1/2 inch, that is, enough space to permit the insects to enter freely, such as flies, to crawl or fly between the wires. Preferably, it will be noted from Figs. 2 and 3 the wires 22 and 27 are staggered. The vertical distance between two adjacent wires 27 may be equal to that between wires 22. The shortest distance between any two adjacent wires 22 and 27 may be as low as 5/16 inch and as large as 1/2 inch depending on the size of the insects to be destroyed and also on the voltage applied between the wires. In order to electrocute an insect it must enter into the gap between the wires 22 and 27 so that its body or any part thereof provides a shortened electrical path, and thereby produces an electric spark which, in turn, will kill the insect.

The insect electrocutor of the invention has utility in a variety of places where insects may be found and is not unattractive in its ornamental aspects as well as strictly utilitarian. It may be placed in any desired location and is not obstrusive. Thus its uses may be itemized as grocery stores, on the meat and vegetable counters, cutting rooms, food processing rooms, or wherever flies and other like insects are wont to gather. Likewise, it may be hung from the ceiling, for example in a dairy barn.

The particularly novel feature of the generally upright grids makes the device, or one patterned after the lines of the upright grids, exceedingly efficacious in exterminating insects in flight when attracted to feeding grounds such as chicken coops and the like.

It will ordinarily not be necessary to bait the insect destroyer. As soon as a few insects or flies have been electrocuted, the tray and the grids will be covered with the vomit and excreta of the insects which will attract more insects. The tray should be periodically cleaned and the destroyed insects disposed of.

There has thus been disclosed an improved insert electrocutor which is of very simple construction. It will be noted that no guards are required and that the two grid structures serve both the purpose of providing an electric field for destroying insects and also provides a rigid structure together with the end covers. All the parts of the device of the invention serve a functional purpose and the effective area of the grid structure is not reduced by guards or portions of the cover. The insect electrocutor encloses a space having a substantial distance in the vertical direction, thereby to intercept insects or flies during their horizontal flight near the ground.

I claim:

An electrical insect destroyer comprising an outer grid structure including a plurality of horizontally disposed substantially parallel wires, said outer grid structure defining generally angularly disposed straight side portions sloped to from a wide base and relatively narrow top portion, said top portion comprising parallel horizontal wires forming part of said outer grid; two end covers secured to and electrically and mechanically connected with said outer grid structure adjacent the ends of the side portions thereof, said outer grid structure and end covers thereby constituting a rigid, unitary structure; an inner grid structure including a plurality of horizontally disposed substantially parallel wires, said inner grid structure being spaced from said outer grid structure a predetermined and substantially constant distance with adjacent wires of said outer and inner grid structures disposed in slightly staggered relationship whereby a substantially unimpeded flight path for insects is provided from outside said outer grid to inside said inner grid structure, an insulating means comprising insulators provided with hollow bores at one end and secured to said end covers at the other end for securing said inner grid structure to said covers with ends of wires of said inner grid structure disposed within the bores and for insulating said inner grid structure from said end covers and thereby from said outer grid structure, said inner grid structure being adapted to be secured to one terminal of a source of high voltage having its other terminal connected to said outer grid structure.

References Cited in the file of this patent

UNITED STATES PATENTS

| | | |
|---|---|---|
| 1,062,516 | Tate | May 20, 1913 |
| 2,061,458 | Folmer et al. | Nov. 17, 1936 |
| 2,177,846 | Swangren | Oct. 31, 1939 |
| 2,219,743 | Karr | Oct. 29, 1940 |
| 2,661,566 | Sokolik | Dec. 8, 1953 |

UNITED STATES PATENT OFFICE
CERTIFICATE OF CORRECTION

Patent No. 2,835,071                                    May 20, 1958

Donald E. Partridge

It is hereby certified that error appears in the printed specification of the above numbered patent requiring correction and that the said Letters Patent should read as corrected below.

Column 4, line 22, for "from" read -- form --.

Signed and sealed this 8th day of July, 1958.

(SEAL)

Attest:

KARL H. AXLINE

Attesting Officer

ROBERT C. WATSON
Commissioner of Patents